(12) United States Patent
Jinkins et al.

(10) Patent No.: US 9,562,788 B1
(45) Date of Patent: Feb. 7, 2017

(54) SYSTEM AND METHOD FOR DOPPLER AIDED NAVIGATION USING WEATHER RADAR

(75) Inventors: Richard D. Jinkins, Rewey, WI (US); Vladislav Gavrilets, Fairfax, VA (US); Richard M. Rademaker, Rijswijk (NL); Daniel L. Woodell, Cedar Rapids, IA (US); Damien B. Jourdan, Falls Church, VA (US); James H. Doty, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 509 days.

(21) Appl. No.: 13/250,798

(22) Filed: Sep. 30, 2011

(51) Int. Cl.
| | |
|---|---|
| *G05D 1/00* | (2006.01) |
| *G05D 3/00* | (2006.01) |
| *G06F 7/00* | (2006.01) |
| *G06F 17/00* | (2006.01) |
| *G01C 23/00* | (2006.01) |
| *G01S 13/87* | (2006.01) |
| *G01S 13/60* | (2006.01) |
| *G01S 13/86* | (2006.01) |
| *G01S 13/95* | (2006.01) |

(52) U.S. Cl.
CPC ............. *G01C 23/00* (2013.01); *G01S 13/60* (2013.01); *G01S 13/86* (2013.01); *G01S 13/87* (2013.01); *G01S 13/874* (2013.01); *G01S 13/953* (2013.01)

(58) Field of Classification Search
CPC ...................................... G01C 23/00
USPC ............................................. 701/1
See application file for complete search history.

(56) References Cited

U.S. PATENT DOCUMENTS

| | | | | | |
|---|---|---|---|---|---|
| 2,849,184 | A | * | 8/1958 | Fredrick | ............... G01S 1/02 342/113 |
| 3,816,718 | A | * | 6/1974 | Hall | ..................... G06G 7/70 244/194 |
| 4,103,300 | A | | 7/1978 | Gendreu et al. | |
| 4,405,986 | A | * | 9/1983 | Gray | ................. 701/4 |
| 4,598,292 | A | * | 7/1986 | Devino | .................... 340/973 |
| 4,912,477 | A | | 3/1990 | Lory et al. | |
| 5,045,855 | A | * | 9/1991 | Moreira | ........... G01S 13/9011 342/25 A |
| 5,166,688 | A | * | 11/1992 | Moreira | ................ 342/25 A |

(Continued)

FOREIGN PATENT DOCUMENTS

| | | | |
|---|---|---|---|
| DE | 19949737 A1 | | 4/2001 |
| GB | 814744 A | * | 6/1959 |

(Continued)

OTHER PUBLICATIONS

Office Action for U.S. Appl. No. 13/250,307, mail date Nov. 5, 2013, 11 pages.

(Continued)

*Primary Examiner* — Harry Oh
(74) *Attorney, Agent, or Firm* — Donna P. Suchy; Daniel M. Barbieri (57) ABSTRACT

An airborne navigation system that uses Doppler information from an on-board weather radar to improve the system's accuracy and/or fault tolerance. The system can determine a drift angle and ground speed from Doppler information associated with radar returns from the Earth's surface. Alternatively, the system can be configured to determine heading angle using the drift angle and a track angle received from another sensor.

11 Claims, 6 Drawing Sheets

(56) References Cited

U.S. PATENT DOCUMENTS

| | | | |
|---|---|---|---|
| 5,202,690 A * | 4/1993 | Frederick | 342/26 B |
| 5,442,364 A | 8/1995 | Lee et al. | |
| 5,530,440 A | 6/1996 | Danzer et al. | |
| 6,205,400 B1 | 3/2001 | Lin | |
| 6,427,122 B1 | 7/2002 | Lin | |
| 6,441,773 B1 | 8/2002 | Kelly et al. | |
| 6,448,922 B1 | 9/2002 | Kelly | |
| 6,516,272 B2 | 2/2003 | Lin | |
| 6,516,283 B2 | 2/2003 | McCall et al. | |
| 6,650,275 B1 | 11/2003 | Kelly et al. | |
| 6,720,890 B1 | 4/2004 | Ezroni et al. | |
| 6,977,608 B1 | 12/2005 | Anderson et al. | |
| 7,109,912 B1 | 9/2006 | Paramore et al. | |
| 7,109,913 B1 | 9/2006 | Paramore et al. | |
| 7,161,525 B1 | 1/2007 | Finley et al. | |
| 7,242,343 B1 | 7/2007 | Woodell | |
| 7,292,178 B1 | 11/2007 | Woodell et al. | |
| 7,307,576 B1 | 12/2007 | Koenigs | |
| 7,307,577 B1 | 12/2007 | Kronfeld et al. | |
| 7,372,394 B1 | 5/2008 | Woodell et al. | |
| 7,379,014 B1 | 5/2008 | Woodell et al. | |
| 7,417,578 B1 | 8/2008 | Woodell et al. | |
| 7,417,579 B1 | 8/2008 | Woodell | |
| 7,486,220 B1 | 2/2009 | Kronfeld et al. | |
| 7,492,304 B1 | 2/2009 | Woodell et al. | |
| 7,492,305 B1 | 2/2009 | Woodell et al. | |
| 7,515,087 B1 | 4/2009 | Woodell et al. | |
| 7,515,088 B1 | 4/2009 | Woodell et al. | |
| 7,528,765 B1 | 5/2009 | Woodell et al. | |
| 7,541,970 B1 | 6/2009 | Godfrey et al. | |
| 7,541,971 B1 | 6/2009 | Woodell et al. | |
| 7,557,735 B1 | 7/2009 | Woodell et al. | |
| 7,576,680 B1 | 8/2009 | Woodell | |
| 7,633,428 B1 | 12/2009 | McCusker et al. | |
| 7,633,430 B1 | 12/2009 | Wichgers et al. | |
| 7,693,621 B1 | 4/2010 | Chamas | |
| 7,696,921 B1 | 4/2010 | Finley et al. | |
| 7,714,767 B1 | 5/2010 | Kronfeld et al. | |
| 7,733,264 B1 | 6/2010 | Woodell et al. | |
| 7,859,448 B1 | 12/2010 | Woodell et al. | |
| 7,859,449 B1 | 12/2010 | Woodell et al. | |
| 7,868,811 B1 | 1/2011 | Woodell et al. | |
| 7,872,594 B1 | 1/2011 | Vesel | |
| 7,889,117 B1 | 2/2011 | Woodell et al. | |
| 7,889,118 B1 | 2/2011 | Finley et al. | |
| 7,965,223 B1 * | 6/2011 | McCusker | G01S 13/913 |
| | | | 340/961 |
| 7,965,225 B1 | 6/2011 | Dickerson et al. | |
| 8,068,984 B2 | 11/2011 | Smith et al. | |
| 8,072,368 B1 | 12/2011 | Woodell | |
| 8,077,078 B1 | 12/2011 | Woodell | |
| 8,140,223 B2 | 3/2012 | Whitehead et al. | |
| 8,159,464 B1 | 4/2012 | Gribble et al. | |
| 8,232,917 B2 | 7/2012 | Scherzinger et al. | |
| 8,296,065 B2 | 10/2012 | Haynie et al. | |
| 8,477,062 B1 * | 7/2013 | Kanellis | 342/65 |
| 8,583,315 B2 | 11/2013 | Whitehead et al. | |
| 8,594,879 B2 | 11/2013 | Roberge et al. | |
| 8,634,993 B2 | 1/2014 | McClure et al. | |
| 8,639,416 B2 | 1/2014 | Jones et al. | |
| 8,643,533 B1 * | 2/2014 | Woodell | G01S 13/882 |
| | | | 342/118 |
| 8,909,471 B1 * | 12/2014 | Jinkins | G01S 13/60 |
| | | | 342/350 |
| 2002/0111717 A1 | 8/2002 | Scherzinger et al. | |
| 2002/0116125 A1 | 8/2002 | Lin | |
| 2002/0116126 A1 | 8/2002 | Lin | |
| 2003/0093187 A1 * | 5/2003 | Walker | B64C 13/20 |
| | | | 701/1 |
| 2003/0102999 A1 * | 6/2003 | Bergin et al. | 342/121 |
| 2004/0072575 A1 | 4/2004 | Young et al. | |
| 2004/0145499 A1 | 7/2004 | Schmidt et al. | |
| 2004/0160364 A1 | 8/2004 | Regev | |
| 2005/0004748 A1 * | 1/2005 | Pinto | G01C 21/165 |
| | | | 701/470 |
| 2005/0150289 A1 * | 7/2005 | Osborne | G01C 21/16 |
| | | | 73/178 R |
| 2005/0230563 A1 | 10/2005 | Corcoran, III | |
| 2006/0244636 A1 | 11/2006 | Rye et al. | |
| 2007/0032951 A1 | 2/2007 | Tanenhaus et al. | |
| 2007/0179684 A1 * | 8/2007 | He | G01C 23/00 |
| | | | 701/3 |
| 2007/0279253 A1 | 12/2007 | Priest | |
| 2009/0021397 A1 | 1/2009 | Wipf et al. | |
| 2009/0152391 A1 * | 6/2009 | McWhirk | B64B 1/02 |
| | | | 244/30 |
| 2009/0164067 A1 | 6/2009 | Whitehead et al. | |
| 2010/0312428 A1 | 12/2010 | Roberge et al. | |
| 2010/0312461 A1 | 12/2010 | Haynie et al. | |
| 2011/0037616 A1 | 2/2011 | Leutelt et al. | |
| 2011/0054729 A1 | 3/2011 | Whitehead et al. | |
| 2011/0184594 A1 * | 7/2011 | Manfred | G01C 21/165 |
| | | | 701/14 |
| 2011/0304479 A1 | 12/2011 | Chen et al. | |
| 2012/0053831 A1 * | 3/2012 | Halder | G01C 21/165 |
| | | | 701/439 |
| 2012/0150426 A1 * | 6/2012 | Conway | G08G 5/0026 |
| | | | 701/120 |
| 2012/0174445 A1 | 7/2012 | Jones et al. | |
| 2012/0215410 A1 | 8/2012 | McClure et al. | |
| 2015/0211883 A1 | 7/2015 | He | |

FOREIGN PATENT DOCUMENTS

| | | |
|---|---|---|
| GB | 1 092 821 A | 11/1967 |
| WO | WO-2009/133102 A1 | 11/2009 |

OTHER PUBLICATIONS

U.S. Appl. No. 13/250,307, filed Sep. 30, 2011, Jinkins et al.
U.S. Appl. No. 13/224,992, filed Sep. 2, 2011, Hufnagel et al.
Final Office Action on U.S. Appl. No. 13/250,307 Dated Jun. 11, 2014, 8 pages.
Notice of Allowance on U.S. Appl. No. 12/263,282 dated Jan. 29, 2016, 8 pages.
Notice of Allowance on U.S. Appl. No. 14/301,199 dated Mar. 1, 2016, 11 pages.
G2000, Garmin, printed from website https://buy.garmin.com/shop/shop.do?cID=153&pID=97668 on Jun. 28, 2011, 2 pages.
G3000, Garmin, printed from website https://buy.garmin.com/shop/shop.do?cID=153&pID=66916 on Jun. 28, 2011, 2 pages.
G5000, Garmin, printed from website https://buy.garmin.com/shop/shop.do?cID=153&pID=90821&ra=true on Apr. 20, 2011, 2 pages.
Office Action for U.S. Appl. No. 13/224,992, mail date Feb. 28, 2013, 10 pages.
Office Action for U.S. Appl. No. 13/743,182, mail date Apr. 8, 2013, 10 pages.
Non-Final Office Action on U.S. Appl. No. 14/482,681, dated Dec. 20, 2016, 9 pages.

* cited by examiner

SYSTEM AND METHOD FOR DOPPLER AIDED NAVIGATION USING WEATHER RADAR

CROSS REFERENCE TO RELATED APPLICATIONS

The present application is related to U.S. application Ser. No. 13/250,307 entitled "Voting System and Method Using Doppler Aided Navigation" filed by Jinkins et al, on an even date herewith, assigned to the Assignee of the present application and incorporated in its entirety herein by reference.

BACKGROUND

The present disclosure relates generally to the field of navigation. More specifically, the present disclosure relates to a system for and method of navigation using weather radar.

Required navigation performance (RNP) specifications for Federal Aviation Administration (FAA) approach procedures require accurate navigation performance. Conventional aircraft often rely on a Global Positioning System (GPS) and Inertial Navigation System (INS) to estimate the aircraft's position (latitude, longitude and altitude) and other flight parameters (e.g., track angle, ground speed, pitch, roll, heading, angular rates and accelerations). In addition, the RNP specifications require redundancy for navigation sources in case of a GPS or other sensor/system outage. In general, conventional systems rely upon an INS and accompanying sensors to provide redundant parameters for navigation. The INS itself is expensive. Sensors for an INS generally must be avionic grade and can also add significant cost. An INS system and associated sensors also increase the weight of the aircraft.

Therefore, there is a need for a system and method that can assist navigation at a low cost and still meet RNP requirements. There is also a need for a system for and a method of determining accurate position to maintain navigation that meets the RNP requirement. Further still, there is a need for a system and method that can determine accurate heading angle, track angle, ground speed and/or other flight parameters that provides continuity in the event of GPS source outage. In case of a GPS outage, aircraft position, track angle and ground speed are no longer provided by the GPS, therefore these parameters have to be provided by another aircraft system. Generally an INS is used to extrapolate the current position using track angle and ground speed that is estimated from integrating angular rates and accelerations that the INS measures. So further still, there is a need for a low cost system and method of determining track angle and ground speed that can be used to extrapolate the current position.

The heading reference from a low cost AHRS does not always meet the accuracy requirements for the heading reference. Therefore still further, there is a need for a system and method that determines accurate heading angle.

Yet further, there is a need for a system and method that determines heading angle, track angle, and ground speed without the addition of significant equipment. Further still, there is a need for a low cost, light weight replacement for an INS or for equipment that estimates accurate heading angle, track angle and ground speed.

SUMMARY

An exemplary embodiment relates to a method of using a weather radar on board an aircraft to determine at least one of a drift angle and ground speed. The method includes receiving data associated with at least two radar return provided by the weather radar and striking the Earth's surface.

Another exemplary embodiment relates to aircraft weather radar systems. The aircraft weather radar system includes an antenna and processing electronics. The antenna is configured to receive a radar return based on radar sweeps. The processing electronics is configured to determine at least one of the drift angle and ground speed parameters using Doppler information associated with multiple (e.g., two or more) radar returns from the Earth's surface.

An exemplary embodiment relates to an aircraft sensor system for use with an aircraft weather radar system. The aircraft weather radar system is configured to provide Doppler information associated with two radar returns from the Earth's surface. The Doppler information is used to provide a drift angle and/or a ground speed.

Another exemplary embodiment relates to an aircraft sensor system. The aircraft sensor system includes a processor configured to receive a drift angle parameter from a weather radar system and a track angle parameter from a sensor source. The processor determines a heading angle using the drift angle parameter and the track angle parameter.

Another exemplary embodiment relates to an aircraft sensor system. The aircraft sensor system includes a processor configured to receive a drift angle parameter from a weather radar system and a heading angle parameter from a sensor source. The processor determines a track angle using the drift angle parameter and the heading angle parameter.

Another exemplary embodiment relates to an apparatus. The apparatus includes means for receiving weather radar return data associated with at least two radar signals that strike the Earth's surface. The apparatus also includes means for determining drift angle and/or ground speed from the Doppler information associated with the radar return data from the Earth's surface.

BRIEF DESCRIPTION OF THE DRAWINGS

These and other features, aspects, and advantages of the present disclosure will become apparent from the following description, appended claims, and the accompanying exemplary embodiments shown in the drawings, which are briefly described below, wherein like numerals denote like elements.

DETAILED DESCRIPTION OF THE PREFERRED EMBODIMENTS

Before describing in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components software, and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

According to one embodiment, a method of using a weather radar on board an aircraft determines at least one of drift angle and ground speed. The method includes receiving first return data associated with a first radar signal provided by the weather radar sensing the Earth's surface, and receiving second return data associated with a second radar signal provided by the weather radar sensing the Earth's surface. The first return data and second return data are provided at different azimuth angles. The method includes determining the drift angle and/or ground speed of the aircraft based on Doppler parameters associated with the first return data and second return data.

In another embodiment, the method includes using another aircraft system for determining heading angle and combining this heading angle with the direction of movement relative to the longitudinal aircraft axis to determine a track angle. In another embodiment, the method can be used to either add redundancy or increase fidelity of position estimation using the ground speed and track angle to allow a degraded aircraft systems derived data set to be used and still meet operational needs. Degradation of the data set could be induced by failure or be the result of a design choice.

Figure 1:
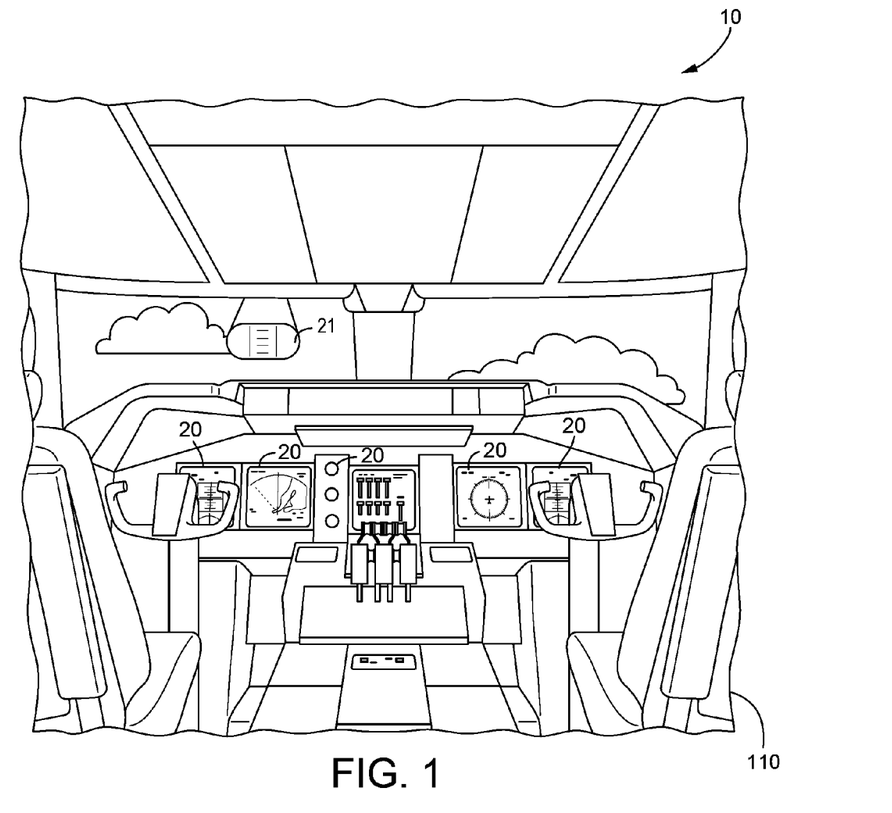
FIG. 1 is a schematic perspective view illustration of an aircraft control center or cockpit, according to an exemplary embodiment.

Referring to FIG. 1, an illustration of an aircraft control center or cockpit 10 for an aircraft 110 is shown, according to one exemplary embodiment. Aircraft control center 10 includes flight displays 20 which are used to increase visual range and to enhance decision-making abilities. In an exemplary embodiment, flight displays 20 may provide an output from a flight management computer, flight management system, an INS, an attitude heading reference system (AHRS), Global Positioning System (GPS) navigation system, aircraft sensor system, or other location or navigation device that can use drift angle, heading angle, track angle or ground speed parameters. The display system for center 10 may include a head-up display system 21.

In a preferred embodiment, aircraft control center 10 can use drift angle and/or ground speed calculated according to the advantageous processes described below. Preferably, drift angle and/or ground speed can be calculated using weather radar returns. The weather radar returns can be received during any phase of flight that is close to the Earth's surface, such as the final phase of flight or approach phase of flight.

Figure 2:
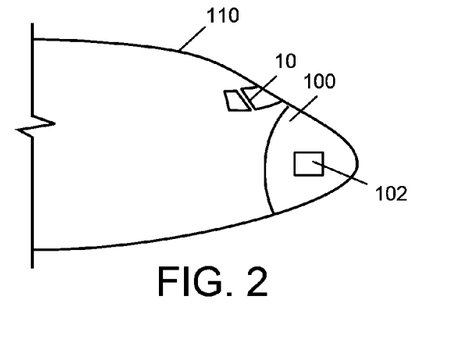
FIG. 2 is a schematic side view illustration of a front of an aircraft with an aircraft control center and nose, according to an exemplary embodiment.

In FIG. 2, the front of aircraft 110 is shown with aircraft control center 10 and nose 100, according to an exemplary embodiment. A weather radar system 102 is generally located inside nose 100 of the aircraft or inside a cockpit of the aircraft. According to other exemplary embodiments, weather radar system 102 may be located on the top of the aircraft or on the tail of the aircraft. Weather radar system 102 may include or be coupled to an antenna system.

Figure 3:
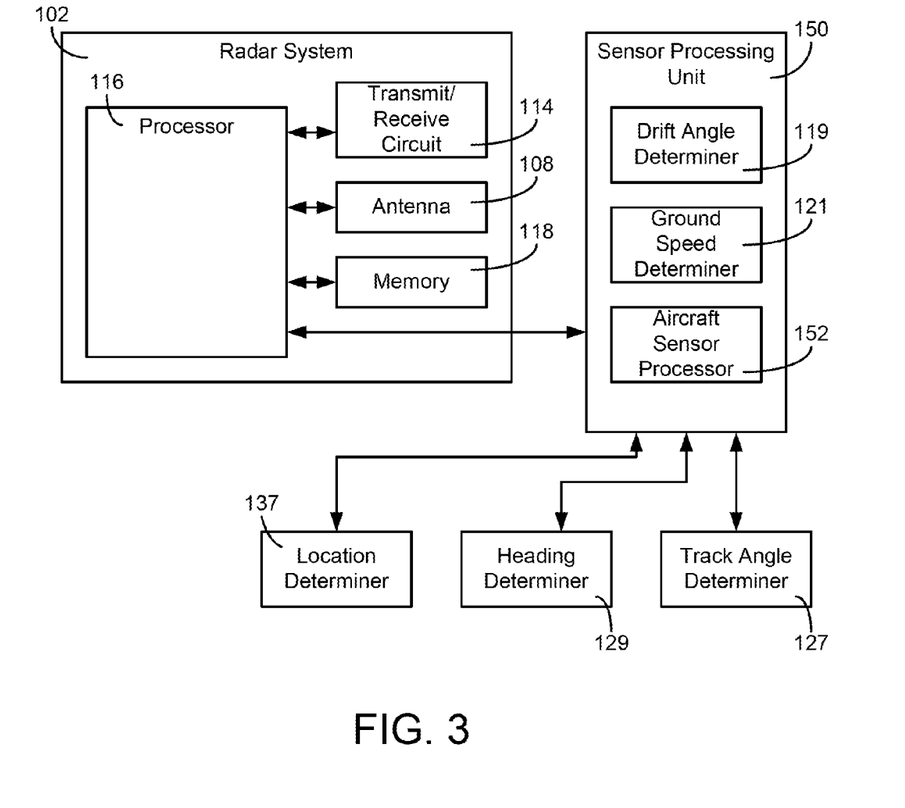
FIG. 3 is a general block diagram of an aircraft weather radar system coupled to a sensor processing unit, according to an exemplary embodiment.

Referring generally to FIG. 3, a sensor processing unit 150 is shown connected to weather radar system 102. Sensor processing unit 150 may be generally configured to receive data from sensors and use the sensor data to determine various parameters. For example, in the embodiment of FIG. 3, sensor processing unit 150 is connected to a heading determiner 129 (e.g., a sensor such as a compass) and uses the sensor data along with data from other sensors to determine a heading angle. Further, sensor processing unit 150 is connected to a track determiner 127 (e.g., a sensor such as a GPS) and uses the sensor data along with data from other sensors to determine a track angle. Further, sensor processing unit 150 is connected to a location determiner 137 (e.g., a sensor such as a GPS) and uses the sensor data along with data from other sensors to determine a location of the aircraft using dead-reckoning (or position extrapolation).

Referring further to FIG. 3, weather radar system 102 is shown in greater detail, according to an exemplary embodiment. Weather radar system 102 may be coupled to or include an antenna 108. Antenna 108 may receive radar returns from a target, such as weather, terrain, etc. Weather radar system 102 can be a system for detecting weather patterns using weather radar returns such as an FAA approved/certified weather radar. Detected weather patterns can be communicated to display 20 for display to the flight crew.

In a preferred embodiment, weather radar system 102 includes a transmit/receive circuit 114, a memory 118, an antenna 108 and electronics (e.g., a processor 116). Processor 116 communicates with a drift angle determiner 119 for determining a drift angle or crab angle in response to weather radar return data and a ground speed determiner 121 for determining ground speed in response to weather radar return data. Radar system 102 preferably provides radar signals via antenna 108 and receives radar returns from transmit/receive circuit 114. Although shown as two different modules or units in communication with processor 116, determiners 119 and 121 can be integrated as a single unit with processor 116 or be separate from processor 116 or system 102. With reference to FIG. 10, determiners 119 and 121 are provided with system 102 as part of processor 116 in an alternative embodiment.

In a preferred embodiment, processor 116 processes the returns using Doppler techniques to determine Doppler velocity factors or parameters. The Doppler velocity factors or parameters can be used to calculate drift angle and ground speed parameters. The drift angle and ground speed parameters can be provided to a processor 152 of a sensor processing unit 150 coupled to system 102. One exemplary embodiment of such a sensor processing unit may be a processor of a combined Global Positioning System (GPS) and attitude heading reference system (AHRS) unit. Advantageously, weather radar system 102 allows a redundant calculation of ground speed and drift angle to be provided without requiring significant additional equipment or weight.

Velocity parameters associated with the Doppler techniques can be used by determiners 119 and 121 to calculate the drift angle and ground speed parameters determiners 119 and 121 can be embodied as separate units or as part of system 102. Alternatively, system 102 can provide the velocity parameters to sensor processing unit 150 for calculation of ground speed and drift angle parameters by sensor processing unit 150. Further still, other avionic components (e.g., flight navigation computer) can calculate ground speed and drift angle parameters using data from system 102 without departing from the scope of the invention. For example, determiner 119 and/or 121 can be part of unit 150 or other aircraft sensor system instead of system 102.

Advantageously, determiners 119 and 121 are configured to determine a drift angle parameter and a ground speed parameter (or alternatively, a relative ground velocity vector including both speed and direction) as data provided to an aircraft sensor processor 152 that could determine the location and is part of a sensor processing unit 150 such as a GPS/AHRS sensor unit. Determiners 119 and 121 and weather radar system 102 can preferably also be coupled to a sensor processing unit 150 via an avionic bus or a connection capable of communicating avionic data. Sensor processing unit 150 can be integrated as one unit or be separate units, (e.g., a GPS unit and an AHRS unit), or be integrated with other equipment, such as, weather radar system 102, a flight management computer, etc.

Radar system 102 can measure velocities of aircraft 110 relative to the Earth's surface using radar returns that strike the Earth's surface. The aircraft velocities relative to the Earth's surface can be used to determine the drift angle parameter in determiner 119 for use by aircraft sensor processor 152. The estimated heading angle can be used in various aircraft sensor systems including head-up displays. Advantageously, head-up displays can receive the heading angle parameter from aircraft sensor processor 152 and benefit from improved heading. In addition, aircraft sensor processor 152 allows a heading angle parameter to be determined when heading determiner 129 is not functional or does not provide sufficient accuracy. Aircraft sensor processor 152 can include a Kalman filter.

In a preferred embodiment, the aircraft sensor processor 152 can utilize the drift angle parameter from determiner 119 and a track angle parameter from a track angle determiner 127 to determine a heading angle estimate or parameter. Heading determiner 129 can be an electronic compass or GPS multi-antenna based system that provides a heading parameter. Alternatively, the track angle parameter can be provided from a different type of aircraft sensor device. Heading angle is generally mathematically related to track angle and drift angle. In one embodiment, the heading angle may be equal to the difference between track angle and drift angle. The mathematical relation between heading angle and track angle holds whether the heading angle and track angle are related to the true north direction or magnetic north direction.

In one embodiment, aircraft sensor processor 152 of sensor processing unit 150 utilizes the drift angle parameter from determiner 119 and a heading angle parameter from determiner 129 to determine a track angle parameter. Aircraft sensor processor 152 allows a track angle parameter to be determined when track angle determiner 127 is not functional or does not provide sufficient accuracy.

In one embodiment, aircraft sensor processor 152 of sensor processing unit 150 can employ a dead-reckoning algorithm to estimate the location of aircraft 110 using the track angle parameter determined by processor 152 and the ground speed parameter determined by ground speed determiner 121 and a prior location of aircraft 110. The estimated location as well as the other navigation parameters like ground speed, track angle and drift angle can be used in various avionic systems.

Determiners 119 and 121 and processor 152 are preferably embodied as software routines and can be combined as a single circuit or routine. Determiners 119, 121 can be software instructions stored on a non-transitory medium. Determiners 119 and 121 use either vertical, diagonal or horizontal sweeps or both types of sweeps to reliably provide a weather radar derived drift angle parameter or ground speed parameter. The parameters can be used as a real time source for confirmation, replacement or adjustment of other values used in avionic systems on board of aircraft 110.

The drift angle parameter and ground speed parameter from weather radar system 102 can be utilized by sensor processing unit 150 or other navigation or location determining devices to provide an accurate determination of the ground speed, drift angle, heading angle, track angle, position or other parameters at a low cost. Preferably, weather radar system 102 is capable of Doppler functionality for drift angle and ground speed determinations so that aircraft sensor systems (e.g., unit 150) can perform navigation functions in the event of a GPS or other outage. In addition, in the event of a GPS outage or other GPS failure, system 102 in combination with sensor processing unit 150 and heading determiner 129 allows aircraft sensor processor 152 to be used to determine the aircraft location without requiring a separate inertial reference system (INS) and therefore allows a lower cost sensors suite to be utilized while meeting RNP specification. RNP requirements can be very strict requiring location of less than a tenth of a mile (e.g., RNP 0.1 specification).

Figure 8:
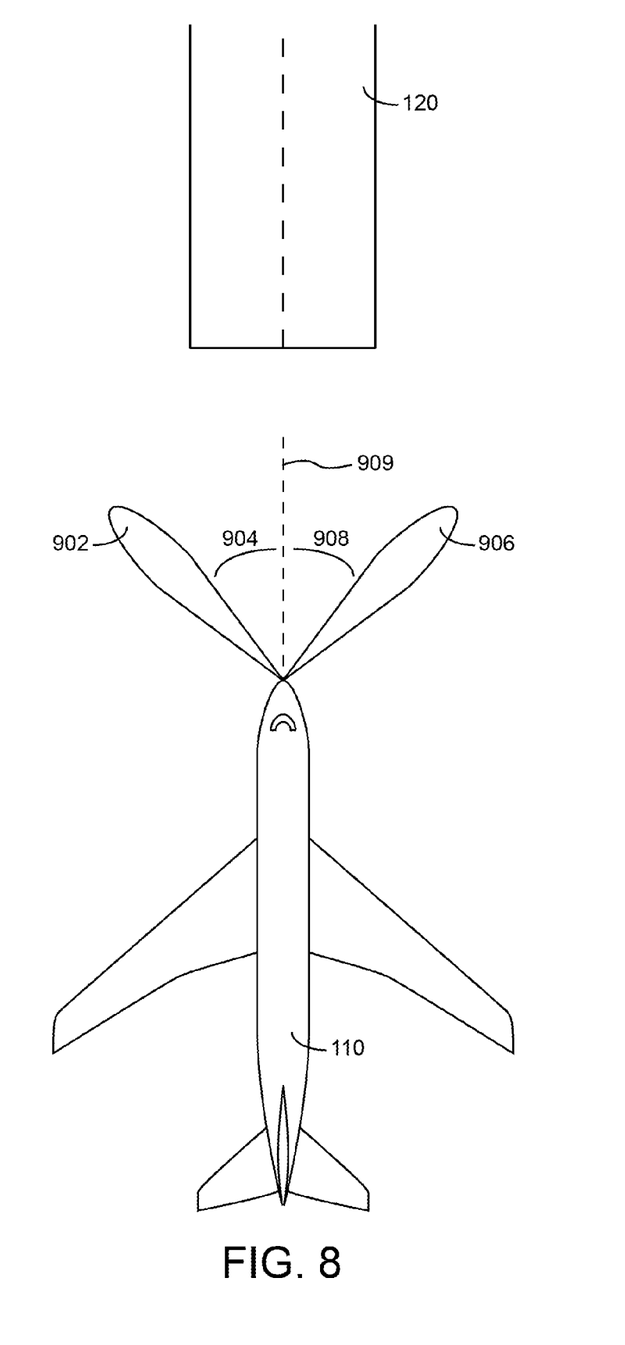
FIG. 8 is a schematic top view schematic illustration of an aircraft using the methods illustrated in FIGS. 5-7 during approach to a runway.

With reference to FIGS. 3 and 8, weather radar system 102 provides a first radar signal, scan or beam 902 at a first angle 904 and a second radar signal, scan or beam 906 at a second angle 908. Both signals can be processed for Doppler information. The Doppler information at the two different angles determine a drift angle and a ground speed parameter or value. Preferably, angles 904 and 908 can be any angles with respect to a center axis or longitudinal axis 909 of aircraft 110. According to one embodiment, the scans are provided on each side of aircraft 110; according to other embodiments, the scans may not be provided on each side of aircraft 110. Signals 902 and 904 reflect on the Earth's surface and are received as returns by antenna 108 and processed by processor 116 through circuit 114 of system 102. Signals 902 and 904 can be incorporated into other weather radar scans associated with weather radar system 102, such as scans used during approach (e.g., windshear scans). Signals 902 and 904 may be part of a single horizontal scan. According to an exemplary embodiment, two signals at different angles may be used. The number of signals and types of scans are exemplary and do not limit the scope of the invention.

In a preferred embodiment, angles 904 and 908 are each at an azimuth angle of 45 degrees from a central axis of aircraft 110 and directed toward the Earth's surface. Radar signals 902 and 906 are provided at different azimuth angles and are scans that are directed toward the Earth's surface. Many different angles and numbers of radar signals can be utilized without departing from the scope of the invention. In a preferred embodiment, ground speed and drift angle are calculated from Doppler parameters to a usable accuracy in the direction of scan.

Figure 4:
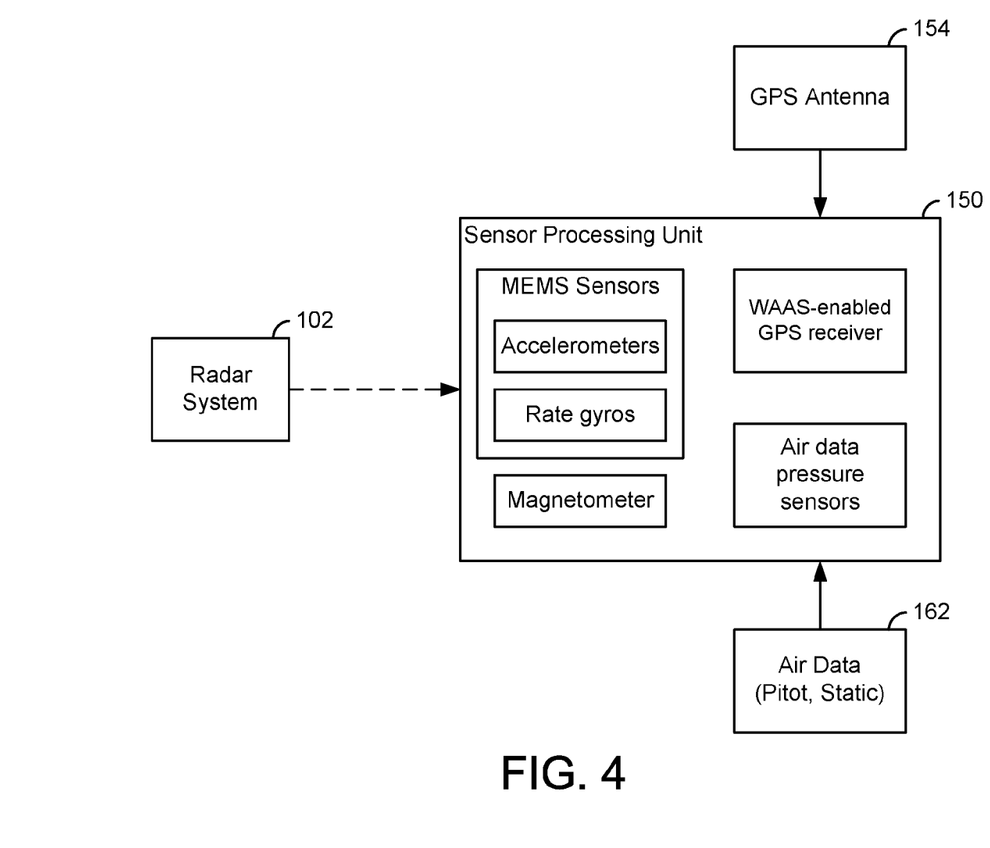
FIG. 4 is an illustration of the block diagram of the sensor processing unit coupled to the weather radar system illustrated in FIG. 3, according to a further exemplary embodiment.

With reference to FIG. 4, sensor processing unit 150 is coupled to weather radar system 102 and data sensors 162. System 102 preferably includes a Doppler sensing capability and can provide an output to unit 150. System 102 can be a RTA-4100 system configured as described herein.

Sensor processing unit 150 uses a GPS antenna 154 for communication with satellites. Sensor processing unit 150 can provide various sensor data for aircraft sensor processor 152 (FIG. 3) including latitude/longitude parameters, track angle parameter, ground speed parameter. The ground speed parameter, latitude/longitude parameter, track angle parameter, and ground speed parameter can benefit from data from system 102. Additional sensors (e.g., air data sensors 162) can provide attitude, roll, pitch and altitude parameters. For example, a heading angle parameter, air speed parameter, vertical speed parameter, indicated air speed parameter, true air speed parameter, angle, rate and accelerometers can be provided by additional sensors as signals to unit 150. Due to the accurate drift angle and ground speed determinations from system 102, lower cost automotive sensors may be able to be utilized with unit 150.

Figure 5:
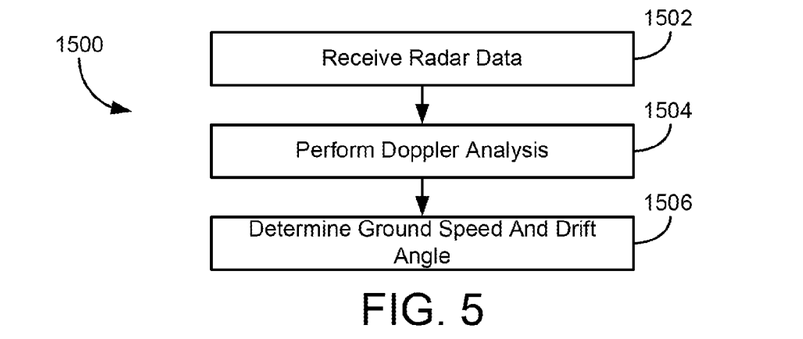
FIG. 5 is a process flow diagram of a method for determining drift angle and ground speed parameters, according to an exemplary embodiment.

With reference to FIG. 5, a method 1500 uses weather radar system 102. At a step 1502, system 102 provides radar signals and receives radar returns or return data. At a step 1504, system 102 performs Doppler analysis on the received radar data, (e.g., weather radar return data). The Doppler analysis is used to determine a ground speed and a drift angle parameter at a step 1506. As discussed above, a ground speed parameter and drift angle parameter can be expressed, stored and communicated as a vector or data. The ground speed parameter and drift angle parameter can be used to calculate other information, such as, heading angle, track angle, location, etc.

The Doppler parameters can be calculated in a Doppler augmentation or Doppler navigator technique. The Doppler navigator technique can determine velocity of aircraft 110 along the ground. Changes in frequency associated with each radar return are used to determine velocity in the direction of the scan in accordance with Doppler theory. In a preferred embodiment, the relative speed in each direction of scan is used to mathematically compute the drift angle and ground speed of aircraft 110. Generally, radar measurements use relative speed with respect to the Earth's surface with respect to the aircraft's own axis. This relative velocity vector can be expressed as a ground speed and a drift angle. To convert the relative ground velocity into an absolute ground velocity an absolute axis reference is needed for the aircraft's own axis. This absolute axis reference can be the true or magnetic heading angle of aircraft 110.

Although only two weather radar signals 902 and 906 are shown in FIG. 8, various numbers of signals can be utilized. In particular, method 1500 can utilize three or more signals. In a preferred embodiment, radar signal 902 is provided to a left side of the flight path of aircraft 110, and radar signal 906 is provided to a right side of the flight path of aircraft 110. Weather radar system 102 can obtain very accurate measurements of aircraft ground speed in the direction of scan by using Doppler parameters. Modified processor 152 can utilize this information to provide an accurate velocity vector for use in a dead-reckoning or coasting algorithm after GPS fails.

Figure 6:
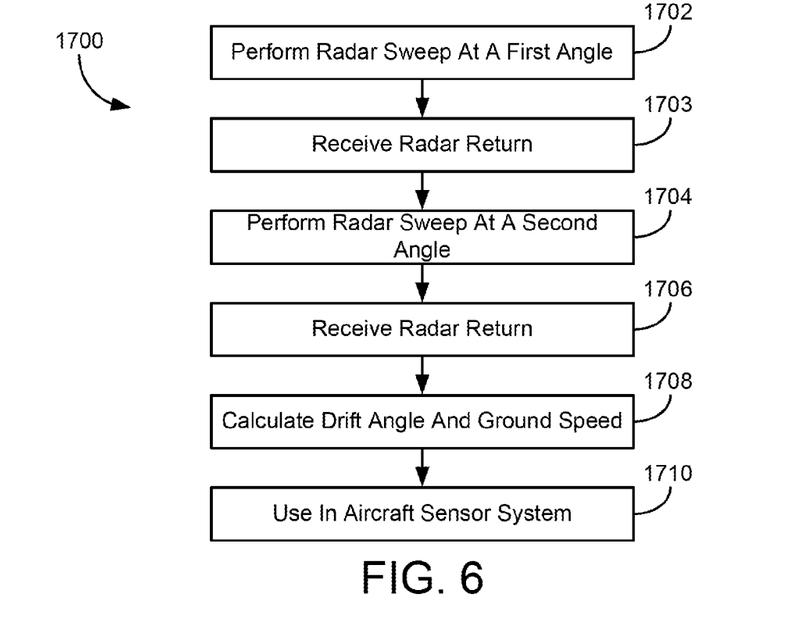
FIG. 6 is a process flow diagram of a method of determining and using drift angle and ground speed parameters, according to a further exemplary embodiment.

At a step 1702, a first radar sweep at a first angle is performed to determine a drift angle parameter and ground speed parameter. At a step 1703, a first radar return from the first radar sweep is received. At a step 1704, a second radar sweep at a second angle is performed.

At a step 1706, a second radar return associated with a second sweep is received. At a step 1708, drift angle and ground speed are determined using Doppler measurements. The drift angle together with a heading angle from another sensor can be used to determine track angle. Track angle and ground speed can be used in a dead-reckoning algorithm to estimate the ground track and current position from where the position was last measured.

At step 1708, the velocity on the left side of aircraft 110 and the right side of aircraft 110 is determined using the Doppler information from the radar returns and both relative speeds are determined in order to determine drift angle and ground speed. Drift angle and ground speed can be determined in system 102. Alternatively, sensor processing unit 150 can utilize the radar return data or velocity indicative data derived from the radar return data and determine the ground speed and drift angle parameter. At a step 1710, drift angle and ground speed parameters or data are utilized in an aircraft sensor system such as sensor processing unit 150. The parameters can be used to extrapolate current position in the sensor processing unit 150 or processor 152. The drift angle and ground speed parameters can be used to derive a data set to replace degraded data so that operational needs can be met.

Figure 9:
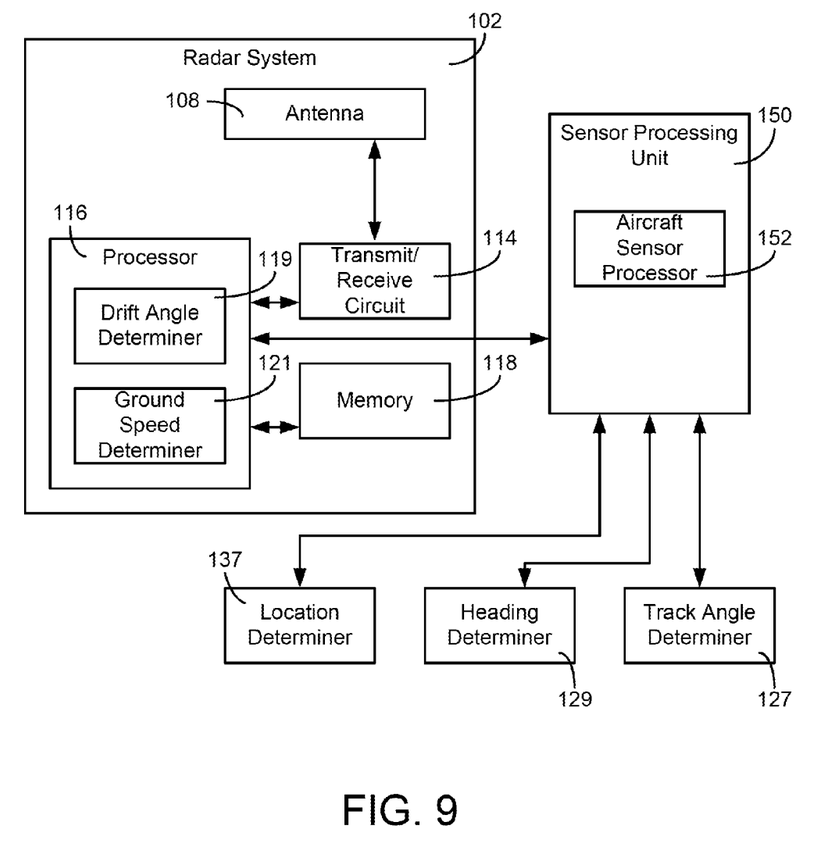
FIG. 9 is a general block diagram of an aircraft weather radar system coupled to a sensor processing unit for a heading estimation, a track angle estimation, a drift angle estimation, or location estimation, according to another exemplary embodiment.

With reference to FIG. 9, a processor 152 as part of an aircraft sensor system (e.g., sensor processing unit 150) determines heading angle using track angle and drift angle. Sensor processing unit 150 can be a navigation computer, flight management computer, GPS/AHRS unit, or other avionic equipment for determining navigation parameters. In one embodiment, sensor processing unit 150 receives a track angle parameter or estimate (e.g., true track angle) from a non-radar source such as a track angle determiner 127 associated with GPS, or other aviation equipment. As discussed above, processor 152 uses the track angle parameter with the drift angle parameter from drift angle determiner 119 of radar system 102 to estimate or improve a heading angle parameter.

Figure 7:
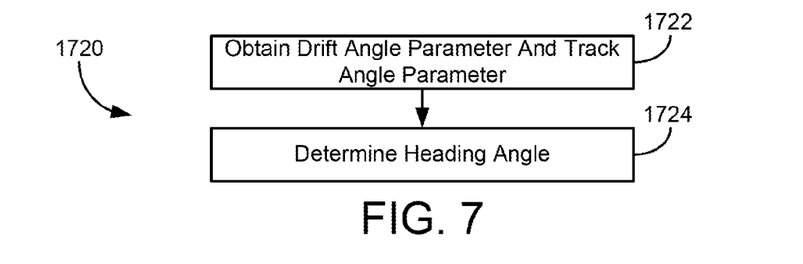
FIG. 7 is a process flow diagram of a method of determining a heading angle, according to an exemplary embodiment.

With reference to FIG. 7, a heading angle can be determined using a process 1720. A drift angle parameter can be received from determiner 119 and a track angle parameter can be received from determiner 127 at a step 1722. The drift angle parameter can be determined according to steps 1702-1708 discussed above with reference to FIG. 6. In one embodiment, ground speed does not need to be determined when determining the drift angle parameter for process 1720. The track angle parameter can be provided by GPS unit 150. At a step 1724, a heading angle parameter can be calculated using the drift angle parameter and the track angle parameter in aircraft sensor processor 152 which may be part of unit 150, system 102, another avionic system, or a standalone unit.

According to one exemplary embodiment, a switched aperture method or monopulse technique may be used to send and receive radar signals 902 and 906. Weather radar system 102 of the aircraft may operate through radar antenna 108 that toggles between transmitting and receiving on the full aperture and transmitting on the full aperture while receiving on the partial aperture. These techniques can be used to accurately estimate at which angle the target was located within the radar beam. This additional information can be used to improve the accuracy of the Doppler calculations correcting for those angles. Signals 902 and 906 can be provided simultaneously or sequentially.

Weather radar system 102 can be any electronic radar platform with Doppler sensing capabilities utilized. Weather radar system 102 preferably is a Rockwell Collins Multiscan™ weather radar system, commercially available from Rockwell Collins, Inc. of Cedar Rapids, Iowa. A radar system manufactured by Honeywell, Inc. can also be configured as described herein to provide drift angle and ground speed parameters without departing from the scope of the invention.

While the detailed drawings, specific examples, detailed algorithms, and particular configurations given describe preferred and exemplary embodiments, they serve the purpose of illustration only. The inventions disclosed are not limited to the specific forms shown. For example, the methods may be performed in any of a variety of sequence of steps, in whole or in part, in various equipment or according to any of a variety of mathematical formulas without departing from the invention. The hardware and software configurations shown and described may differ depending on the chosen performance characteristics and physical characteristics of the radar and processing devices. For example, the type of system components and their interconnections may differ. The systems and methods depicted and described are not limited to the precise details and conditions disclosed. The flow charts show preferred exemplary operations only. The specific data types and operations are shown in a non-limiting fashion. Furthermore, other substitutions, modifications, changes, and omissions may be made in the design, operating conditions, and arrangement of the exemplary embodiments without departing from the scope of the invention as expressed in the appended claims.

What is claimed is:

1. An aircraft sensor system using a weather radar system on board an aircraft, comprising:
    a sensor that is not part of a Global Positioning System (GPS), not part of the weather radar system, and not part of an inertial navigation system, the sensor configured to provide a heading angle parameter in response to at least one of a GPS and an inertial navigation system undergoing an outage or other failure;
    a weather radar configured to receive radar returns sensing the Earth's surface on both a left side and a right side of the aircraft; and
    processing electronics configured to provide a drift angle parameter for the aircraft using Doppler measurements associated with the radar returns from the Earth's surface from the left side of the aircraft and the right side of the aircraft and configured to use the drift angle parameter from the Doppler measurements and the heading angle parameter from the sensor, wherein the processing electronics are further configured to provide a track angle for the aircraft, wherein the track angle is calculated using the drift angle parameter that was found using the Doppler measurements and the heading angle parameter that was found using the sensor that is not part of a GPS, not part of the weather radar system, and not part of an inertial navigation system.

2. The aircraft sensor system of claim 1, wherein the processing electronics are configured to determine a ground speed parameter, wherein at least one of the track angle parameter and the ground speed parameter are used to replace degraded or missing parameters provided by other navigation sensors.

3. The aircraft sensor system of claim 1, wherein the processing electronics are part of a weather radar system.

4. The aircraft sensor system of claim 1, wherein the aircraft weather radar system uses a sub-aperture or monopulse technique.

5. The aircraft sensor system of claim 1, wherein the processing electronics are configured to determine a ground speed parameter, wherein the ground speed parameter is used to replace a degraded or missing parameter provided by another navigation sensor.

6. The aircraft sensor system of claim 5, wherein at least one of the track angle parameter and the ground speed parameter are used when a GPS device fails.

7. The aircraft sensor system of claim 5, wherein at least one of the track angle parameter and the ground speed parameter are used to confirm or determine a location of the aircraft.

8. The aircraft sensor system of claim 5, wherein at least one of the track angle parameter and the ground speed parameter are used for a location determination to maintain the Required Navigation Performance (RNP) requirements of the aircraft.

9. The aircraft sensor system of claim 1, wherein the heading angle is provided to a head-up display.

10. The aircraft sensor system of claim 1, wherein the heading angle is used to replace degraded information provided by other navigation sensors.

11. The aircraft sensor system of claim 10, wherein a replaced degraded heading angle is provided by an attitude heading reference system (AHRS) device or a GPS/AHRS device.

* * * * *